United States Patent

[11] 3,571,973

[72] Inventor Frank D. Roberts
 North Reading, Mass.
[21] Appl. No. 821,791
[22] Filed May 5, 1969
[45] Patented Mar. 23, 1971
[73] Assignee Rixson Inc.
 Franklin Park, Ill.

[54] CLOSURE OPERATOR
 12 Claims, 11 Drawing Figs.
[52] U.S. Cl. .................................................. 49/2, 49/31, 160/6
[51] Int. Cl. ..................................................... E05f 15/20
[50] Field of Search ........................................ 49/1—7, 31; 98/110, 106; 160/2/6

[56] References Cited
 UNITED STATES PATENTS

| | | | |
|---|---|---|---|
| 1,708,980 | 4/1929 | Verstraete | 49/2X |
| 1,834,036 | 12/1931 | Simpson | 49/31X |
| 2,159,696 | 5/1939 | Gross | 98/110 |
| 3,139,022 | 6/1964 | Koplar | 49/2 |
| 3,207,273 | 9/1965 | Jurin | 49/31X |
| 3,260,018 | 7/1966 | Schuh | 49/7 |
| 3,456,387 | 7/1969 | Tolson | 49/31 |
| 3,477,176 | 11/1969 | Tansley | 49/31X |

Primary Examiner—Dennis L. Taylor
Attorney—Augustus G. Douvas

ABSTRACT: A closure operator to effect remote, failsafe opening and closing of a closure, particularly a single-blade or multiblade-type damper.

A damper latch is attached directly to the damper to prevent momentary opening of the blades in response to transient pressures caused by wind, pressure blasts, or the like. Appropriate linkages connect the closure operator to the damper latch and to all blades to effect opening and closing as desired.

In particular, the closure operator features a pivoted operator lever coupled to the damper linkages. An electromagnet carrier, including an armature latch, is driven by a motor to engage a cooperating driving arms latch pivoted on the operator lever. Engagement of the latter two latches locks the operator lever to the driven electromagnet carrier so that the lever and carrier move in unison.

The carrier-controlled movement of the lever releases the damper latch and opens the damper blades. The lever and carrier are stopped in the damper open position, when a limit microswitch is actuated in response to full opening of the damper.

Upon the occurrence of (1) a manual switch operation to effect damper closure, (2) a power failure, (3) circuit malfunctioning, or (4) the detection of an undesired condition such as smoke or fire, the electromagnet is deenergized. This enables immediate disengagement of the two latches; and the electromagnet carrier thus releases the operator lever to immediately close and latch securely the damper blades.

INVENTOR
Frank D. Roberts.

INVENTOR
Frank D. Roberts.

By A. G. Duval
ATTORNEY

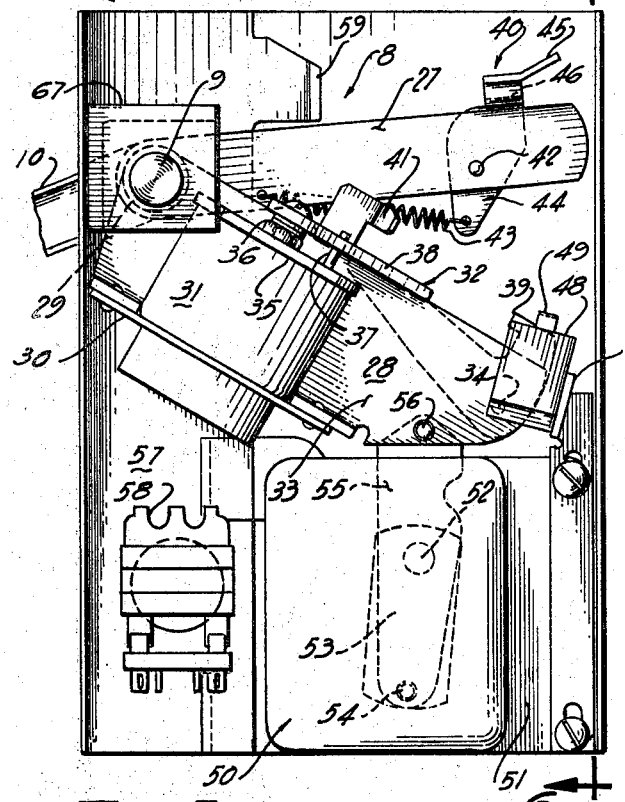

INVENTOR
Frank D. Roberts

By [signature]
ATTORNEY

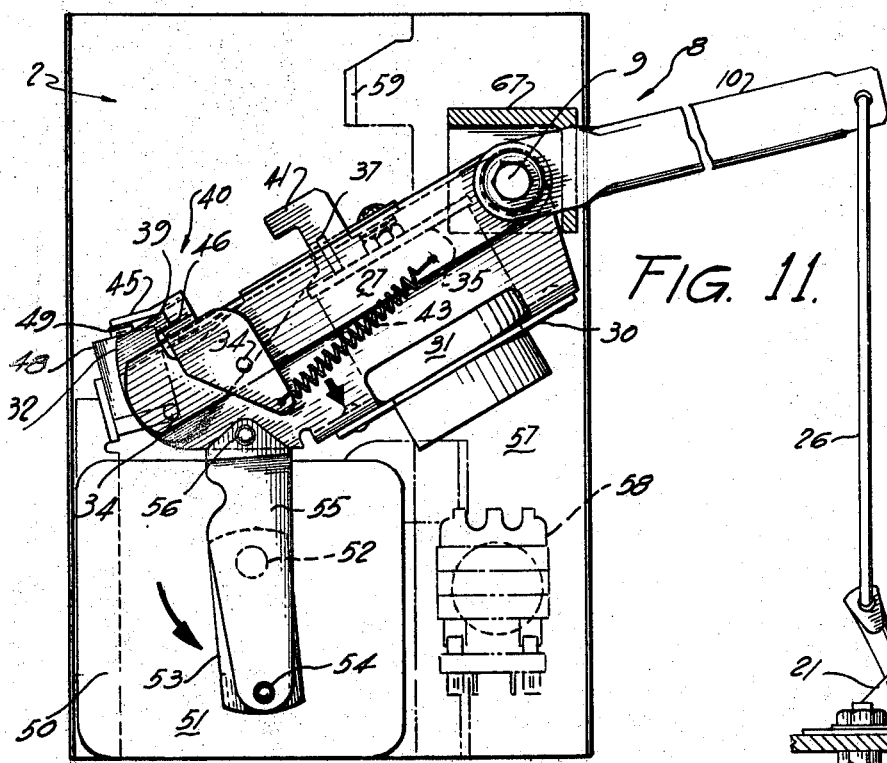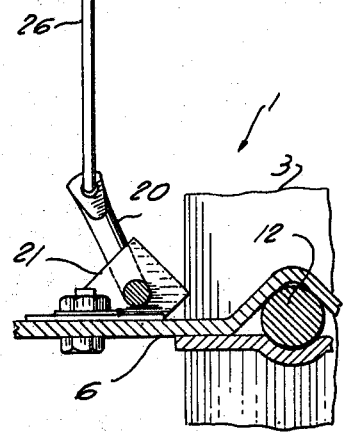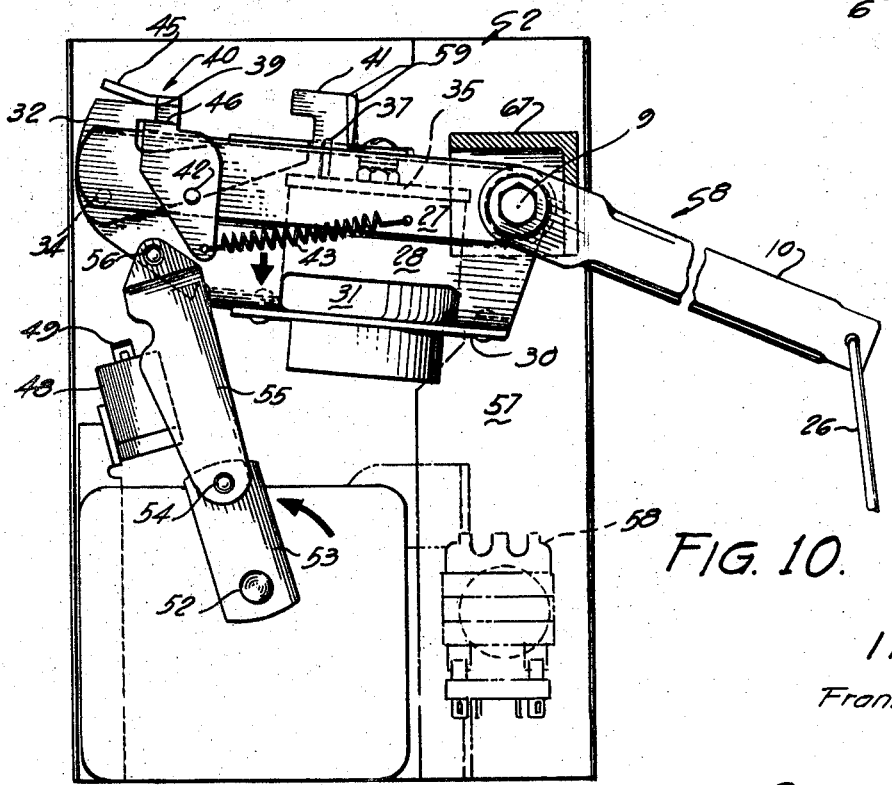
FIG. 11.
FIG. 10.
INVENTOR
Frank D. Roberts.
ATTORNEY.

3,571,973

CLOSURE OPERATOR

BACKGROUND OF THE INVENTION

In recent years an increased emphasis has been placed upon the need for improved safety devices to minimize the loss of life and property occurring from the products of combustion. The prevalence of large buildings with air-conditioning and ventilating ducts through walls requires the installation of dampers in these openings to isolate an unsafe building area from the remaining areas in the event of a hazardous condition. These dampers must close quickly and reliably in the event of a fire, otherwise the products of combustion will travel through the damper containing ducts or fire walls. Additionally, the dampers should preferably be capable of restoration to an operate condition without extensive manual servicing occasioned by the necessary replacement of components, such as fusible links, or the rearming of the detection system by reengaging various linkages.

The damper control system should also be failsafe in the sense that a power failure, or other circuit malfunction in the undesired-condition detecting system, will automatically close the damper. Additionally, upon restoration of power, or correction of the circuit malfunction, the damper must be operated without the necessity for a service man to obtain access to the damper to replace or rearm components.

DESCRIPTION OF THE PRIOR ART

Almost invariably damper control devices of the prior art have employed fusible links. The melting of these links effects damper closure by activating a closure mechanism. The use of fusible links is generally unsatisfactory due to the delay involved in melting the link which enables the products of combustion to spread. Additionally, such systems are not failsafe; and they require manual replacement of each link before the dampers are readied for further operation.

Examples of fusible link systems are shown in U.S. Pat. Nos. 3,337,991, 3,327,764, 3,273,632 and 2,954,728.

Other remotely related patents have described louver, vane, or door positioners. The controls for these devices have in some instances dispensed with fusible links, but in most instances the systems are either not failsafe, or alternatively, upon occurrence of an undesired condition, manual restoration of the system is required.

Examples of these systems appear in U.S. Pat. Nos. 3,249,148, 3,219,104, 3,207,273, 3,177,367, 3,164,404 and 2,980,970.

SUMMARY OF THE INVENTION

The closure operator of this invention is contained within a housing mounted adjacent and in close proximity to the damper. The damper and operator may be located in a duct or fire wall which is remote and difficult to service.

Inasmuch as a fusible link is eliminated, and a quickly responsive fire or smoke detector, such as a photocell or ionization-type sensor, is employed, damper closure is effected immediately. A manual switch remotely located can also open or close the damper as required.

In the event of a power failure, or detector malfunctioning, the damper automatically closes. Upon correction of these conditions, the damper is automatically restored to the desired position.

The structure for attaining these functions is briefly described in the abstract.

DETAILED DESCRIPTION OF THE DRAWINGS

In order that all of the structural features for attaining the objects of this invention may be readily understood, reference is herein made to the following drawings wherein:

FIG. 4 is a sectional view taken along line 4-4 of FIG. 3 and showing the principal components of the damper operator in the positions assumed when the damper blades are closed;

FIG. 5 is a sectional view taken along line 5-5 of FIG. 3 and showing the position of the operator components immediately after the electromagnet has been deenergized to release the armature latch and thus permit disengagement of the driving arm of the operator lever to a position wherein the damper blades are closed;

FIG. 6 is a sectional view taken along line 6-6 of FIG. 4 and showing some of the mechanical details of the operator closure components in the program position of FIG. 4 wherein the damper blades are closed;

FIG. 7 is a schematic circuit diagram of the electrical components of the closure operator and an auxiliary amplifier associated with condition detecting means (not shown);

FIGS. 8, 9, 10 and 11 are all sectional views taken along the corresponding line of FIG. 3, and including also the damper arm of the operator lever which actuates the multiblade damper;

FIG. 8 shows the principal components of the closure operator in the position required to effect damper closure, with the switching circuitry of FIG. 7 being in the condition shown;

FIG. 9 shows a first sequential step in the program of the closure operator effected by operating the circuitry of FIG. 7 to energize the drive motor and the carrier electromagnet whereby the latch elements are driven toward engagement;

FIG. 10 shows a second sequential step in the program of the closure operator wherein the latch elements are engaged; and FIG. 11 shows a third sequential step in the program of the closure operator wherein further operation of the drive motor after engagement of the latch elements has carried the driving arm of the operator lever together with the electromagnet carrier to a limit position defined by the opening of a limit switch (to thus maintain the damper blades in the open position).

DETAILED DESCRIPTION OF THE PREFERRED EMBODIMENT

Figure 1:
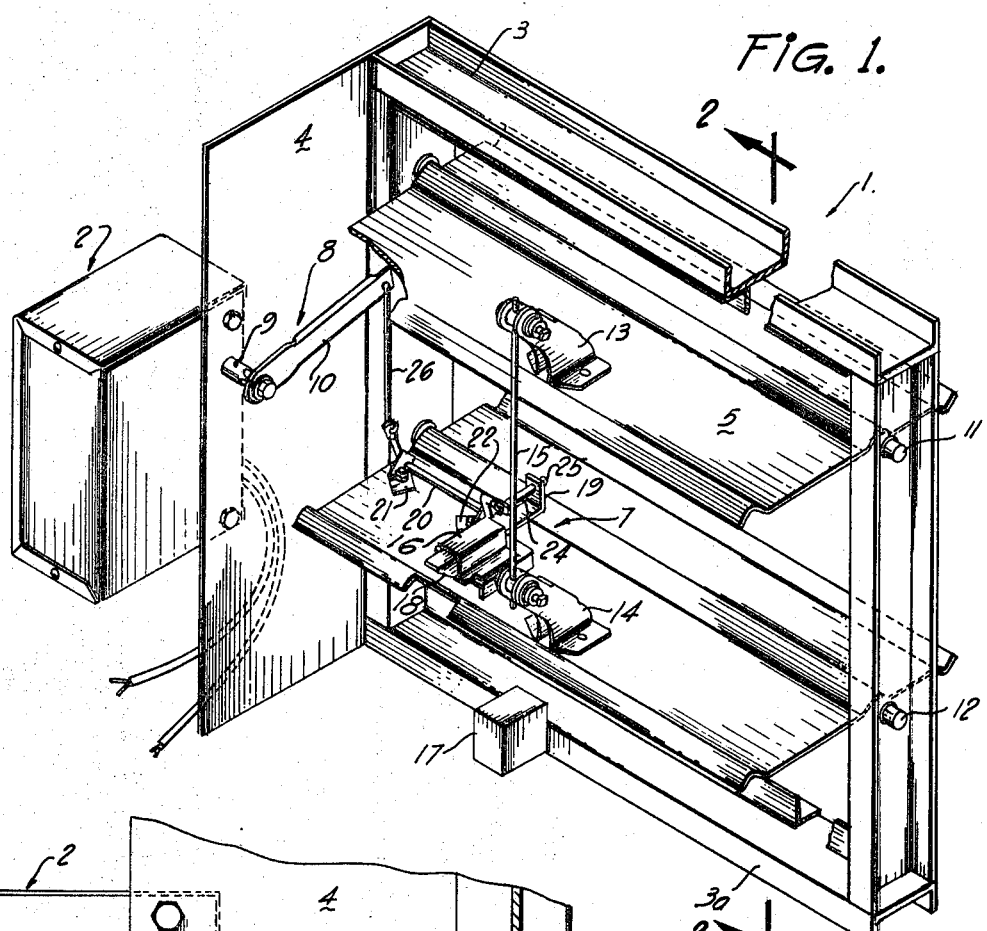
FIG. 1 is a perspective view showing the closure operator of this invention applied to a multiblade damper with the damper latch released and the blades in the open position.
Figure 2:
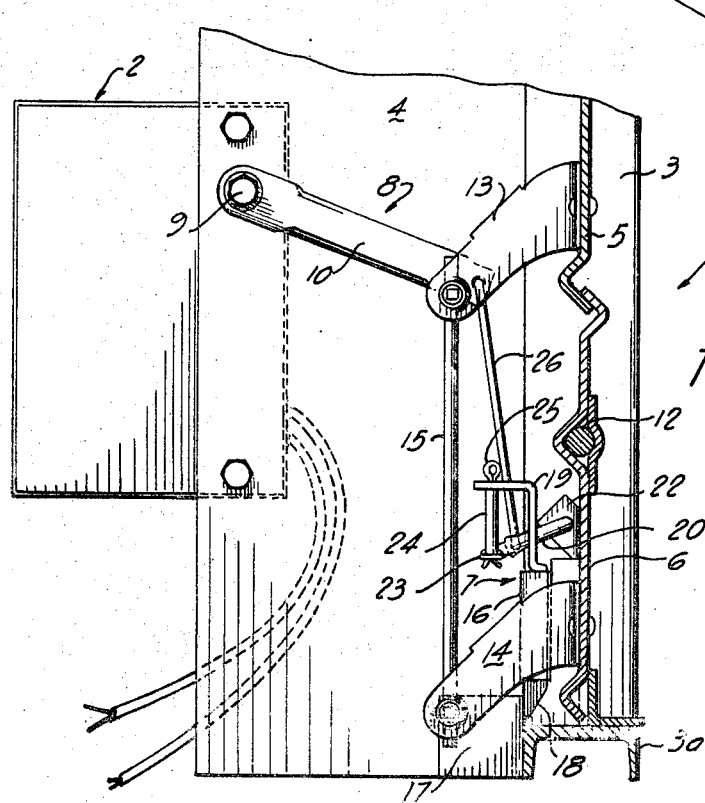
FIG. 2 is a partial sectional view taken along line 2-2 of FIG. 1 and showing the damper blades in the closed position and locked in this position by the damper latch.
Figure 3:
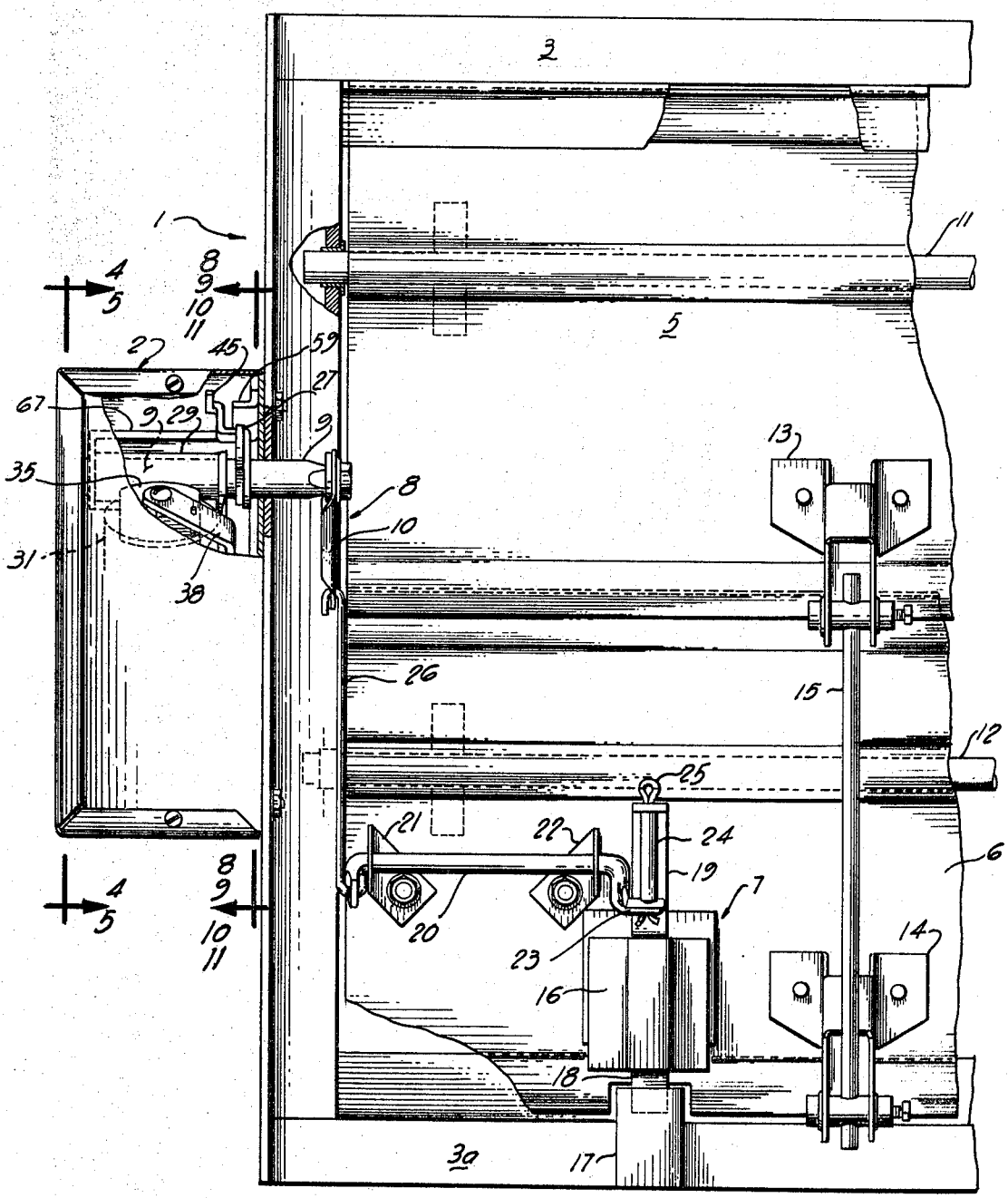
FIG. 3 is an elevation view of a portion of the damper in the latched position shown in FIG. 2, and with a portion of an operator closure cover being broken away so as to show some of the details of the operator mechanism.

Referring now to FIGS. 1 through 3, the opening and closing of multiblade damper 1 is controlled by closure operator 2 which is supported relative damper frame 3 by means of projecting support plate 4. The opening and closing of damper blades 5 and 6, as well as damper latch 7, is effected by operator lever 8. Operator lever 8 includes a pivot shaft 9 rigidly fixed to damper arm 10 of the operator lever. When damper arm 10 is driven to the elevated position shown in FIG. 1, blades 5 and 6 are maintained open relative frame 3. When damper arm 10 is driven downwardly, as is shown in FIGS. 2 and 3, blades 5 and 6 are closed relative frame 3 and latch 7 is engaged to maintain the blades in the closed position.

Thus, it is the output function of closure operator 2 to rotate pivot shaft 9 in a controlled manner to drive damper arm 10 through a narrow angular arc. At the low terminal position of the arc (see FIGS. 2 and 3) damper 1 is closed and rigidly latched. At the high terminal position of the arc (see FIG. 1) damper 1 is opened after unlatching.

The details of the internally housed components of closure operator 2 will be described at a later portion of the application. At this point, it is appropriate to first describe the damper linkages which actuate blades 5 and 6 as well as latch 7 in response to the movements of damper arm 10.

Each of blades 5 and 6 pivots on a pivot shaft 11 and 12, respectively. Additionally, each of blades 5 and 6 carries a hinge 13 and 14, respectively. The terminal ends of hinge connecting rod 15 are coupled to hinges 13 and 14 so that blades 5 and 6 open and close in unison.

The lower portion of blade 6 supports a housing 16 for damper latch 7; and the bottom channel 3a of damper frame 3 supports catch 17 of damper latch 7. When the latch-actuating spring (not shown) enclosed within latch housing 16 drives latch plunger 18 into engagement with catch 17, damper blades 5 and 6 are maintained fixedly closed relative damper frame 3 as is shown in FIGS. 2 and 3. Plunger-actuating arm 19 is mechanically coupled to plunger 18 within latch housing 16 so that elevation of actuating arm 19 withdraws plunger 18 from catch 17 thereby disengaging the latch.

Lifting and latch release link 20 is pivotally supported on the lower portion of blade 6 by release link supports 21 and 22. Link 20 is a rod of generally U-shaped configuration, the right terminal end of which is formed with an apertured projection 23.

Cylindrical pivot tube 24 houses cotter pin 25 so that plunger-actuating arm 19 is coupled and responsive to the movements of lifting and latch release link 20.

Coupling link 26 connects the terminal end of damper arm 10 to the left terminal portion of lifting and latch release link 20 (FIGS. 1 and 3).

Accordingly, in brief summary, assuming the damper to be in the closed blade position shown in FIGS. 2 and 3, counterclockwise rotation of shaft 9 elevates damper arm 10 to lift coupling link 26. The lifting of link 26 turns lifting and latch release link 20 within link supports 21 and 22. This turning action pivots cylindrical pivot tube 24 through a relatively small angular arc and ultimately lifts plunger actuating arm 19 to withdraw responsively latch plunger 18 relative catch 17.

With latch 7 released, the further elevation of coupling link 26 by damper arm 10 subjects link 20 to a lifting force which causes blades 5 and 6 to pivot about pivot shafts 11 and 12, to thus open the damper blades and to permit the flow of air therethrough.

In the event damper arm 10 is released quickly by closure operator 2, as will be later described, coupling link 26 permits blades 5 and 6 to pivot and drop to the closed position as is shown in FIGS. 2 and 3. Latch 7 is also engaged so that momentary forces, such as those exerted by combustion pressure blasts or wind gusts, cannot cause a responsive flapping of blades 5 and 6.

Referring now particularly to FIGS. 4 through 6, it is a primary function of a operator 2 to provide rotating shaft output at pivot shaft 9 so that latch 7 may be operated and blades 5 and 6 opened and closed as required. Additionally, closure operator 2 is failsafe in the sense that power failure, or circuit malfunction in the condition responsive detector and amplifier (for example, a smoke or fire detection system) will effect damper closure.

In the event that upon occurrence of a damper is desired, manual closure of an appropriate switch will operate closure operator 2 to open the damper blades. These blades will remain open so long as a hazardous condition, such as fire or smoke, does not occur. Upon occurrence of such a condition, closure operator 2 immediately releases damper arm 10 from its elevated or damper open position to effect damper closure and also latching of the damper latch.

In FIGS. 4 through 6, the principal components of closure operator 2 includes driving arm 27 of lever operator 8. It is important to note that damper arm 10 and driving arm 27 are rigidly fixed relative one another through pivot shaft 9; therefore, angular movement of driving arm 27 causes a responsive angular movement in damper arm 10. In particular, if driving arm 27 is elevated as is shown in FIG. 4, damper arm 10 is at its lowermost position as is also shown in this FIG. However, if driving arm 27 is lowered as is shown in FIG. 5, damper arm 10 is responsively elevated angularly as is shown in this figure.

Electromagnet carrier 28 also pivots about the axis for pivot shaft 9. Carrier 28 is formed with a cylindrical pivot tube 29 which envelopes pivot shaft 9 (see FIG. 6). However, pivot tube 29 is free to pivot independently of shaft 9; and therefore, carrier 28 is free to move independently of operator lever 8 (unless, however, these components are latched as hereafter outlined).

Electromagnet carrier 28 is formed with a lower flange 30 which fixedly supports electromagnet 31.

Carrier 28 i not only carrier carries electromagnet 31, but it also pivotally supports armature latch 32 on vertical side arm 33.

Pivot 34 pivotally couples armature latch 32 relative carrier 28 (FIG. 5). Armature latch 32 includes an armature plate 35 made of a magnetic material so as to be attracted by the field of electromagnet 31. Armature plate 35 is coupled to armature support arm 38 of latch 32 by bolt 36. Armature plate 35 rigidly supports guide pin 37 which passes through an aperture formed in armature support arm 38 of armature latch 32. Guide pin 37 aligns armature plate 35 relative electromagnet 31 by eliminating any relative rotation of plate 35 with respect to support arm 38. The upper right portion of armature latch 32 (FIGS. 4 and 6) carries latch catch finger 39.

FIG. 4 shows armature latch 32 with its plate 35 in contact with the upper surface of electromagnet 31 in response to the magnetic force of the electromagnet, or alternatively in response to the force of gravity acting about pivot point 34 when electromagnet 31 is deenergized.

FIG. 5 shows the position of armature latch 32 and its armature plate 35 after electromagnet 31 has been deenergized and latch catch finger 39 has been subjected to a clockwise force about pivot 34 previously applied by driving arm latch 40. It should be noted, as is shown in FIG. 5, that the upward pivot position of armature plate 35 is limited by means of projecting stop 41 which is part of electromagnet carrier 28 projecting from side arm 33 of this carrier.

Pivot 42 couples driving arm latch 40 to driving arm 27 of operating lever 8. Bias spring 43 is connected between the lower portion 44 of driving arm latch 40 and driving arm 27 so as to exert a clockwise pivoting force about pivot 42 (FIGS. 4 and 5).

The upper portion of driving arm latch 40 is formed with a switch actuating finger 45 and latch catch portion 46 (FIG. 6). Latch catch portion 46 engages finger 39 of armature latch 32 as will be later described so that operating lever 8 is locked to move responsively with carrier 28 whenever latch components 32 and 40 are engaged.

Switch support bracket 47 supports microswitch 48 so that this microswitch may be appropriately actuated by switch actuating finger 45. Microswitch 48 contains a single-pole, normally closed contact (not shown), which is opened whenever operating switch arm 49 is depressed by switch actuating finger 45.

Drive motor 50 includes a gear reduction housing 51 with shaft output appearing at shaft 52.

Motor drive link 53 is fixedly coupled to output shaft 52; and pivot 54 couples the terminal end of drive link 55 to link 53.

Pivot 56 couples the upper terminal end of coupling link 55 to vertical side arm 33 of electromagnet carrier 28.

In a preferred embodiment, shaft 52 rotates at about 7 R.P.M. to rotate drive link 53 at a corresponding rate, which in turn causes coupling link 55 to pivot the electromagnet carrier angularly about cylinder pivot 29. When carrier 28 is driven upwardly with electromagnet 31 energized, armature latch 32 engages driving arm latch 40. With this engagement, further rotation of link 53 and responsive movement of link 55 causes driving arm 27 of operator lever 8 to be lowered in association with the engaging carrier 28.

When switch actuating finger 45 contacts switch arm 49, the contact of microswitch 48 is opened, thus deenergizing drive motor 50.

The deenergization of motor 50, with driving arm 27 of operating lever 8 in its lowermost position, represents an open position of damper blades 5 and 6 of damper 1.

Support bracket 57 carries power relay 58, projecting stop 59 which limits the upper movement of driving arm 27, and pivot housing 67.

The electrical connection of electromagnet 31, microswitch 48, motor 50, and power relay 58 to a manual switch 60 to effect opening and closing of the damper blades as desired in a failsafe manner is shown in FIG. 7. Additionally, the schematic circuitry of FIG. 7 incorporates a condition responsive detector and amplifier unit 61 which is failsafe in operation.

In particular if all of the components of detector and amplifier circuitry 61 are properly operative, damper 1 will open open manual closure of switch 60. If, however, detector and amplifier unit 61 is not properly operative, or alternatively, the detector senses a condition such as flame or smoke, damper blades 5 and 6 will close if opened or remain closed.

The detailed operation of the circuitry of FIG. 7 is as follows:

Assuming detector and amplifier unit 61 is in proper operating condition and that the detector (not shown) input at terminals 62 and 63 indicates an absence of a flame or smoke condition, damper 1 may be opened or closed in response to the manual operation of switch 60. That is, closure of switch 60 applies line voltage from terminals 64 and 65 to amplifier A of detector and amplifier unit 61. The application of line voltage to amplifier A energizes amplifier output relay 66, thereby closing normally open contact 66a.

The closure of contact 66a applies line voltage to the winding of power relay 58. With the occurrence, normally open contact 58a is closed, thereby applying line voltage to energize electromagnet 31 and to energize motor 50 through normally closed microswitch 48.

The energization of motor 50 drives electromagnet carrier 28 from the position shown in FIG. 4 upwardly until latches 32 and 40 engage one another whereupon driving arm 27 is lowered in response to the further movements of carrier 28. Damper arm 10 is thus pivoted to elevate coupling link 26 to disengage damper latch 7, thus raising blades 5 and 6 to open the damper.

Driving arm 27 is carried downwardly by electromagnetic carrier 28 to a point at which actuating finger 45 contacts switch arm 49 of microswitch 48. The normally closed contact of microswitch 48 is opened, thus deenergizing motor 50 and maintaining the damper blades in an open position.

In the event of a power failure, or alternatively in the event of a circuit malfunction within detector and amplifier unit 61, amplifier output relay 66 is deenergized, thus opening contact 66a and deenergizing power relay 58. Contact 58a of power relay 58 is then released and electromagnet 31 is deenergized. Deenergization of electromagnet 31 enables the weight of the open damper blades to be exerted through operator lever 8 to thus lift armature plate 35 away from electromagnet 31 (see FIG. 5). This enables latch 32 and driving arm latch 40 to be disengaged. This disengagement effects the release of driving arm 27. Damper arm 10 thus lowers coupling link 26, permitting blades 5 and 6 to close and latch 7 to catch.

In the event there is no power failure to the circuitry of FIG. 7, no malfunctions in the detector and amplifier unit 61, and the condition detector (not shown) connected to the input terminals 62 and 63 of amplifier A detects a condition (such as smoke or fire), amplifier output relay 66 is deenergized thus releasing contact 66a. Release of contact 66a effects closure of the damper blades in a manner previously outlined with respect to power failure.

FIGS. 8 through 11 each show sequential program steps of the principal components of closure operator 2.

Figure 8:
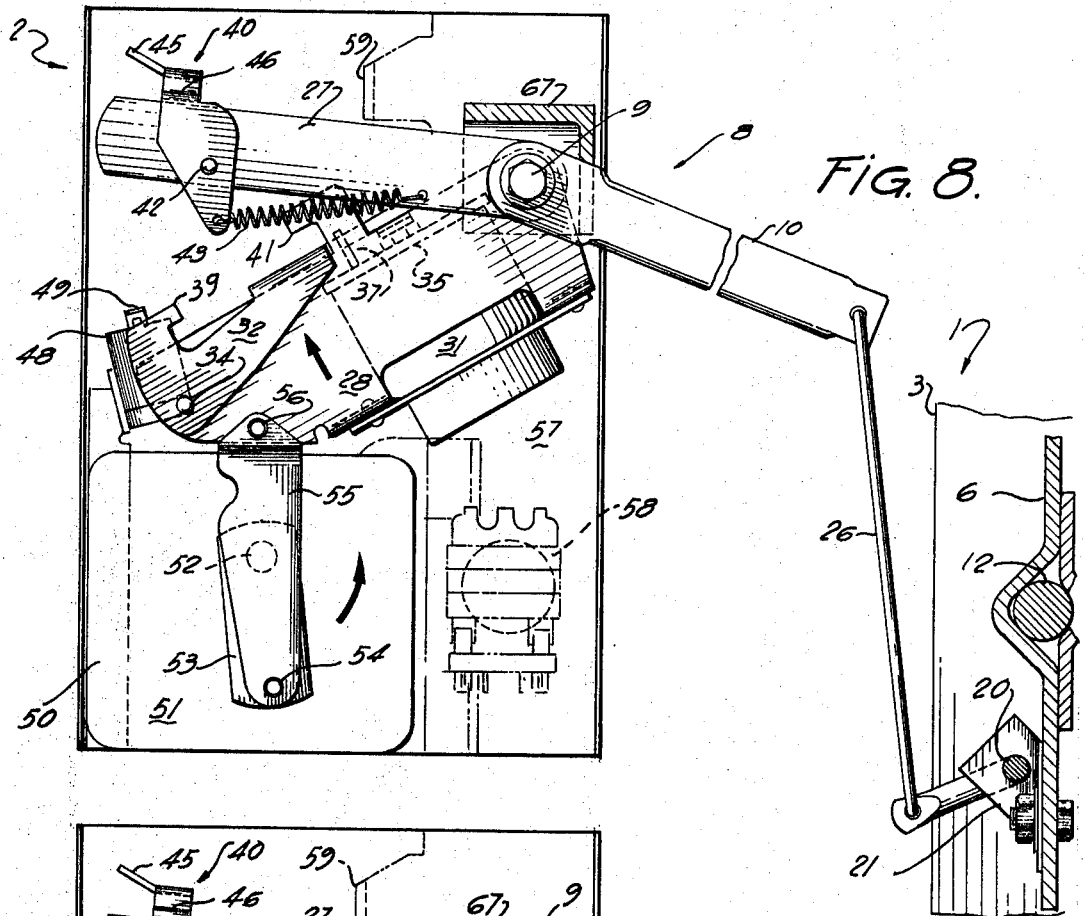

Assuming a starting position of damper 1 wherein blades 5 and 6 are closed due to the open position of manual operate switch 60 (see FIG. 7, motor 50 will have stopped in a position wherein links 53 and 55 are substantially in alignment as is shown in FIG. 8. In this position electromagnet carrier 28 is drawn downwardly by means of force exerted thereupon through pivot 56.

Figure 9:
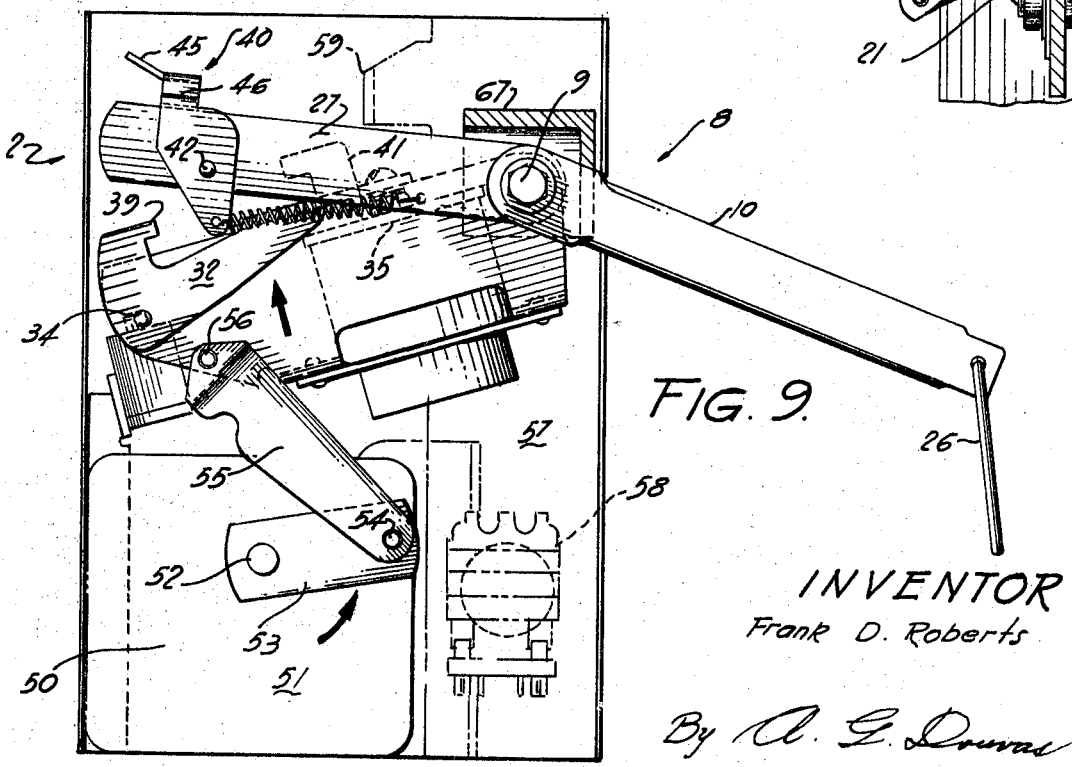

After manual operate switch 60 is closed, and assuming that no fire or smoke condition is detected, contacts 66a and 58a (FIG. 7) will close, thereby energizing motor 50 and electromagnet 31. As motor 50 is energized, link 53 is driven in a counterclockwise direction, thereby driving link 55 in an upward direction (FIG. 9). Link 55 exerts a force upon pivot FIG. 56 which elevates carrier 28 as is shown in FIG. 9. This causes carrier 28 to approach driving arm 27.

Motor 50 continues to rotate link 53 until links 53 and 55 assume a position of longitudinal axial alignment (FIG. 10). At this position, latch catch finger 39 of armature latch 32 engages latch catch portion 46 of driving arm latch 40 so that electromagnet carrier 28 and driving arm 27 are coupled one to the other.

As is shown in FIG. 11, the continued counterclockwise rotation of link 53 ultimately brings links 53 and 55 in overlapping alignment whereupon actuating finger 45 engages operating switch arm 49 to open the contact of microswitch 48.

With the opening of this contact, motor 50 is deenergized and operating lever 8 remains in the position shown in FIG. 11. In this position of lever 8, coupling link 26 is elevated to disengage damper latch 7 and open damper blades 5 and 6.

In the event of power failure, circuit malfunctioning within detector and amplifier unit 61, or the detection of a flame or smoke condition, relay windings 66 and 58 are deenergized, thereby opening contacts 66a and 58a. The resultant deenergization of electromagnet 31 enables the weight exerted upon latch catch finger 39 by means of driving arm 27 to lift armature plate 35 away from electromagnet 31 as is shown in FIG. 5. Accordingly, driving arm latch 40 is released from engagement with armature latch 32 as is shown in FIG. 5; and driving arm 27 of operator lever 8 is raised in the direction of the arrow (FIG. 5), thus permitting the damper blades to close.

In the event the power failure or circuit malfunction is corrected, or the smoke or fire condition is eliminated, opening and closing of damper 1 can again be effected by operation of manual switch 60. In particular, if switch 60 is closed, the damper will automatically open. If switch 60 is open, then this switch must be closed to open the damper.

The replacement of parts at the damper typical of prior art systems employing fusible links is eliminated. In the fusible link systems, as may be readily appreciated, it is necessary for a service man to manually replace the fusible link which is associated with the damper blades. This operation is usually inconvenient inasmuch as the damper may be located within ductwork which is relatively inaccessible.

It should be readily appreciated that the closure operator of this invention can be employed with closures other than dampers and that the operative movement of damper arm 10 can be employed to effect other type closure functions not normally associated with dampers.

I claim:

1. A closure operator comprising an operator lever for opening and closing the closure, a latch pivoted on the operator lever, a movable electromagnet carrier mounted adjacent the operator lever supporting an electromagnet, an armature latch pivoted on the electromagnet carrier and magnetically coupled to the electromagnet, a drive motor, linkage means coupling the output of the drive motor to the electromagnet carrier to move the electromagnet carrier, and electrical circuitry energizing the motor to cause the linkage means to drive the carrier to the operator lever to effect engagement of the two latches by pivoting the operator lever latch and thus lock the operator lever with the carrier to alter the position of the closure in response to the further movement of the carrier after the locking action occurs.

2. The combination of claim 1 including a limit switch located adjacent the operator lever and actuated by contact with the first latch after the movement of the operator lever is effected through the locking action, thus deenergizing the motor and maintaining the closure in a given position.

3. The combination of claim 2 in which deenergization of the electromagnet releases the armature latch to open the lock effected by the latches to thus release the operator lever and permit the closure to return to its initial position in response to the weight of the closure.

4. The combination of claim 3 in which the closure is a damper having one or more blades.

5. The combination of claim 4 in which the damper includes a damper latch which is released by movement of linkage means carried by the operator lever and associated with the damper.

6. An operator for a pivoted-blade damper having a frame comprising a pivoted operator lever including a driving arm and a damper arm coupled to the damper blade to open and close the blade relative to its frame, a driving arm latch pivoted on the driving arm and spring biased into a given position, an electromagnet carrier pivoted about an axis common to the pivot axis of the operator lever, an electromagnet supported by the carrier, an armature latch pivoted on the carrier and magnetically biased to a fixed position by energization of the electromagnet, a drive motor having a rotating shaft output, a motor driven link connected to and rotated by the motor shaft, and a coupling link coupling the carrier to the motor driven link whereby energization of the motor pivots the carrier through an angular arc and towards the driving arm latch to effect engagement of the two latches at one extremity of the arc to thus cause the engaged carrier and operator lever to open the damper blade relative the damper frame upon return of the carrier and the driving arm to the second extremity of the angular arc.

7. The combination of claim 6 including a limit switch located adjacent the driving arm, and a switch-actuating finger coupled to the driving arm latch to open the switch upon return of the carrier and the operator lever to the second extremity of the angular arc to thus deenergize the drive motor and maintain the damper blade in its open position.

8. The combination of claim 7 in which deenergization of the electromagnet releases the armature latch to open the lock effected by the latches to release the operator lever and thus permit return of the damper blade to its closed position in response to the weight of the blade.

9. The combination of claim 8 in which the damper includes a damper latch having portions carried by the blade and frame to lock the damper blade relative its frame, and in which the latch is released by the movement of the operator lever to open the blade.

10. The combination comprising a damper having a frame and a blade pivoted relative the damper frame and including also a latch having portions carried by the frame and blade to lock the blade in the closed position relative the frame, an electromechanical damper operator means associated adjacent the damper, and linkage means carried by the damper interconnecting the blade and latch for releasing the latch to permit opening the blade and for closing and locking the blade upon engaging the latch, the electromechanical operator means being failsafe in response to power failure and internal circuit malfunctioning to actuate the linkage means to effect a desired opening or closing of the blade latch and also to close the blade and engage the latch in response to power failure or a circuit malfunction.

11. The combination of claim 10 in which the electromechanical damper operator means includes a lock which is electromechanically engaged and then moved to effect opening of the damper and which lock is disengaged to effect closure of the damper in response to a power failure or a circuit malfunction.

12. The combination of claim 11 in which the lock includes an electromagnet which is energized to effect engagement of the lock and deenergized to effect disengagement of the lock.